(12) United States Patent
Hsiao

(10) Patent No.: US 6,664,665 B2
(45) Date of Patent: Dec. 16, 2003

(54) CORELESS TYPE LINEAR MOTOR

(75) Inventor: Shune-Shing Hsiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 70 days.

(21) Appl. No.: 09/920,935

(22) Filed: Aug. 3, 2001

(65) Prior Publication Data

US 2003/0025403 A1 Feb. 6, 2003

(51) Int. Cl.[7] .............................................. H02K 41/00
(52) U.S. Cl. ........................................................ 310/12
(58) Field of Search ............................. 310/12, 13, 14, 310/52, 58, 59, 64, 65; 318/135

(56) References Cited

U.S. PATENT DOCUMENTS

| | | | | |
|---|---|---|---|---|
| 5,565,718 A | * | 10/1996 | Takei | ........................... 310/12 |
| 5,703,418 A | * | 12/1997 | Assa | ........................... 310/12 |
| 5,723,917 A | * | 3/1998 | Chitayat | ........................ 310/12 |
| 6,037,680 A | * | 3/2000 | Korenaga et al. | ............. 310/12 |
| 6,262,503 B1 | * | 7/2001 | Liebman et al. | .............. 310/64 |

* cited by examiner

*Primary Examiner*—Nestor Ramirez
*Assistant Examiner*—Judson H. Jones
(74) *Attorney, Agent, or Firm*—Bacon & Thomas, PLLC

(57) ABSTRACT

A linear motor includes an improved heat dissipation mechanism, which has the function of increasing the area of heat dissipation from coils of the linear motor, reducing the weight of the rotor, and simplifying the heat dissipation mechanism. The coils of the present invention have open centers which serve as heat dissipation holes. A heat sink compound is smeared around the heat holes to increase the area of heat dissipation, and reduce the weight of the rotor such that the thrust and operating life of the motor is increased. Furthermore, the present invention also can include a heat dissipation mechanism (such as a heat pipe or an air blowing pipe) set into the heat holes near the heat source to raise heat dissipation efficiency.

6 Claims, 2 Drawing Sheets

CORELESS TYPE LINEAR MOTOR

BACKGROUND OF THE INVENTION

1. Field of the Invention

Linear Motors can be classified into core and coreless types, according to whether the rotor has a core or not. The present invention relates to a coreless type linear motor, and especially to a coreless linear motor having a better heat dissipation effect.

2. Description of the Prior Art

Rotors of commonly known linear motors are mainly composed of coils and epoxy resin. The coils are used to provide the rotor with a variable magnetic field while the epoxy resin is used to fasten coils. When electric current passes coils of the rotor, a magnetic field is produced and interacts with the magnetic field of the permanent magnet to generate thrust. The manufacturing process of the rotor is to place the coils made of copper wires into the body of the plate-type rotor, and then to use epoxy resin and or other kinds of resin to fill and wrap around the whole coils to increase the strength of the rotor. Because a substantial part of the energy generated by electromagnetic interaction is transformed into heat energy, the temperature of the coil rises which causes the electric resistance of the coils to rise. In this way, the electric current value of the coils is reduced, thereby decreasing the efficiency of the rotor and limiting the maximum thrust. In addition, variation of temperature also results in some problems, such as expansion and shrinkage of material, which causes the assembly of the parts to be too tight or too loose.

Commonly known methods for heat dissipation are classified into the following two kinds: one is to set a coolant pipe into the rotor, and the other is to use compressed air to carry heat away from the rotor surface (as disclosed in U.S. Pat. No. 5,703,418). Both methods described above have obvious disadvantages: the former requires a coolant pipe to be set into the limited space provided by the rotor, so that the mechanism is more complicated, the manufacturing cost is higher, the volume and weight of the rotor are increased, and an extra mechanism is required to guide the flow of liquid for heat dissipation, which is not economical. The second method, which is to use compressed air to cool the surface of the rotor, is simpler than the first method, but does not dissipate heat as effectively because the heat conductivity of the closed structure used for wrapping the coils is poor, resulting in a large temperature difference between the surface of the rotor and the nearby area of the coils.

Therefore, methods for heat dissipation present a big problem in designing a linear motor.

SUMMARY OF THE INVENTION

The purpose of the present invention is to solve the disadvantages, such as poor heat dissipation ability, complicated heat dissipation mechanism, and high manufacturing cost, of the conventional coreless type linear motor. In addition, the present invention also avoids the conditions that the assembly of parts is too tight or too loose, and that the efficiency of the motor lowers due to rise in temperature after the linear motor is used for a period of time.

The method of heat dissipation in the present invention first seeks to avoid using a coolant pipe, in order to avoid the need for pipes in the rotor of the linear motor and other complicated mechanisms to make the coolant flow. Instead, for enhancing the effect of heat dissipation, the heat resistance of the heat source and surrounding is lowered. In order to achieve the reduction in heat resistance, the coils of the rotor are not designed as winding type coils but rather have openings in the centers of the coils. Although this may increase the volume slightly, heat generation is more centered such that it is easy and convenient to make the heat dissipate to the air by forming holes at the center of the coils, or in the area around the coils, and to make the holes interlink to external air. This method not only increases the contact area between the coils of the rotor and air, but also adds to the effect of heat dissipation of coils by eliminating the insulating substance that isolates the coils and prevents thermal conduction. In addition, the method reduces the weight of the rotor and increases the effective thrust of the linear motor due to the reduced mass.

Because the coils of the rotor provide the motive force of the linear motor and also suffer from counterforce, a heat sink compound with good thermal conductivity is smeared around the coils for the sake of protecting the coils. The heat sink compound can improve the thermal conductivity between the coils and the material around the coils. For the sake of further promoting the heat dissipation effect of the rotor, the heat sink compound is smeared around the heat dissipation holes to enlarge the heat dissipation area. In this way, when the rotor of the motor moves, flowing air around the rotor can efficiently carry heat away from the surface of the heat sink compound.

Some mechanisms require rotors having a structure with higher strength, in which case the heat sink compound can fill up the heat holes. Consequently, the rotor can provide a better heat dissipation effect, and have better structural strength. In order to promote a heat dissipation effect between the heat sink compound and air, ragged strips are set at the contacting surface between the heat sink compound and air to increase the heat dissipation effect.

On the other hand, a heat pipe may be fastened by the heat sink compound and buried in the heat hole. One end of the heat pipe is buried near a coil while the other end is extended to the outside of the closed structure of the coils, so that heat from the coils can be conducted easily to the outside via the heat pipes. The heat pipe is preferably made of metal having good thermal conductivity so that heat can be conducted along the heat pipe. For some airtight hollow heat pipes, the interior is designed to be almost a vacuum, and to have very good thermal conductivity. In order to make the thermal conduction effect even better, the end of the heat pipe, which is at the exterior of the closed structure of the coils can be connected with a heat sink, which is usually made of metal, and can help to transfer heat to air.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
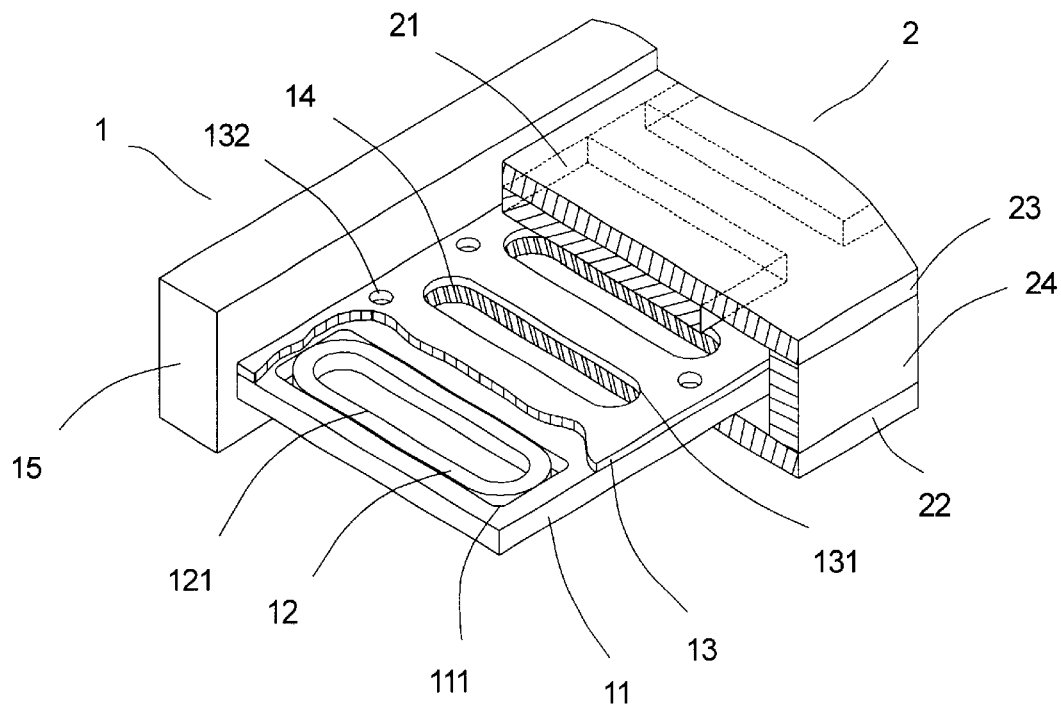
FIG. 1 is a perspective, partially cutaway view of one embodiment of the present invention.

FIG. 1 is a perspective, partially cutaway view of a first preferred embodiment of the present invention, wherein the linear motor contains a rotor 1 and a stator 2, the stator 2 has a U-shape, and the rotor 1 can slide in the U-shaped structure. The stator 2 is composed of two guide plates 22, 23, several plates of permanent magnets 21 and a stator bottom plate 24. The guide plates are made of ferromagnetic material, which usually is pure iron to reduce hysteresis. Several plates of permanent magnets 21 are pasted on the top surface of the guide plate 22 and the bottom surface of the guide plate 23. The stator bottom plate 24 is set at the middle of the guide plates 22 and 23 having permanent magnets 21 and holds them to make the whole structure a U-shape structure. After the structure is assembled, the permanent magnet 21 is at the middle of guide plates 22, 23, and neighbors the rotor 1. The rotor 1 has a plate form, and is composed of a rotor base 15, made of a conventional rotor material such as Teflon™ or plastic, upper cover 13, bottom cover 11, coils 12 and heat sink compound 14. Coil troughs 111 are set in the bottom cover 11, and coils 12 are placed into the coil troughs 111. Heat holes 131 are set in the upper cover 13. After the upper cover 13 and the bottom cover 11 are assembled, heat sink compound 14 is smeared over the heat holes 131 and the coil troughs 111 to maintain the stability of coils 12.

In the preferred embodiment, the heat holes 131 are set near the coils 12 of the rotor 1, and the heat sink compound 14 in the heat holes 131 has good thermal conduction properties, and, in addition, the heat sink compound 14 can contact air directly because of the placement of heat holes 131, so heat produced by the coils 12 can be conducted to the surface of the rotor 1 directly via the heat sink compound 14 of the heat holes 131, and then heat is easily carried away by the flowing air as the rotor 1 is moving and not isolated by the upper cover 13 or other components of the rotor 1. The structure is simple and volume is not added, so that the economic value is increased.

Moreover, the weight of the rotor is reduced because the heat holes 131 are set in the rotor 1, and the heat sink compound 14 is only smeared on the surface of the coil wall 121 such that the weight of the rotor 1 is lighter than that of commonly known linear motors, and the inertia of the rotor is reduced while the effective thrust of the rotor is increased. In the figure, heat dissipation holes 132 are set near the coils 12 to increase the heat dissipation effect of the rotor. Alternatively, in order to avoid reducing the strength of the rotor 1, the heat sink compound can be filled into the heat dissipation 5 holes 132. The thermal conduction effect of the heat sink compound is better than that of epoxy resin and causes the rotor to have good strength.

Figure 2:
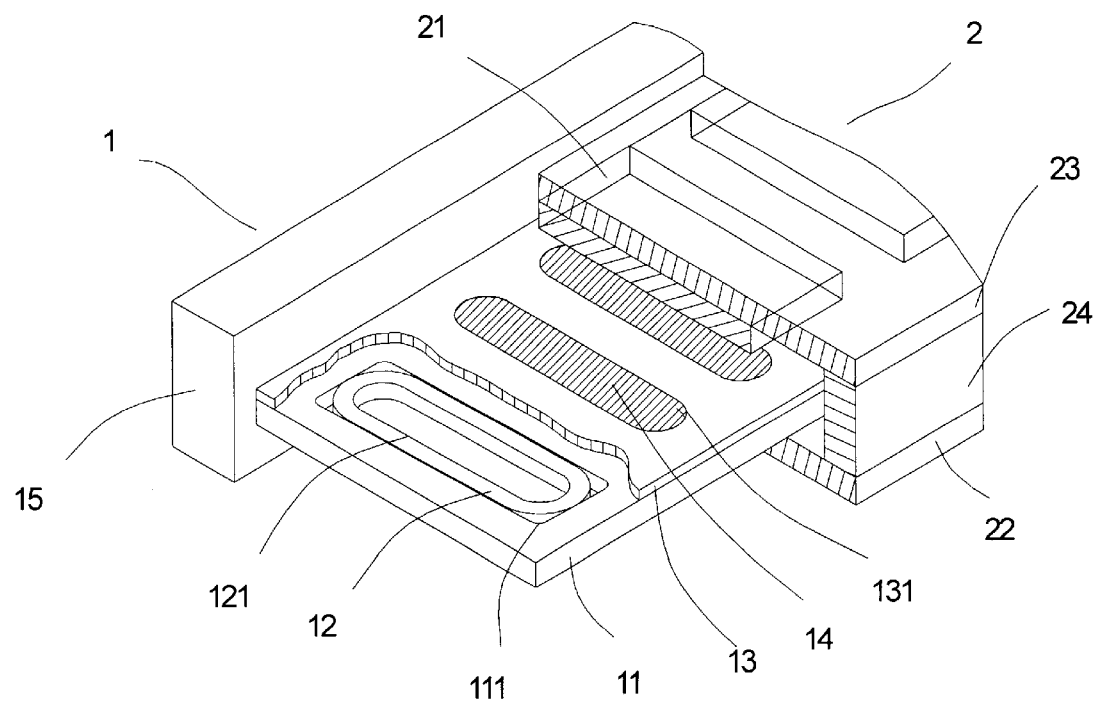
FIG. 2 is a perspective, partially view of another embodiment of the present invention.

FIG. 2 is a perspective, partially cutaway view of another preferred embodiment of the present invention, wherein the main difference from the linear motor of FIG. 1 is that the heat sink compound is filled into the heat holes 131 of the rotor 1. The heat holes 131 filled with the heat sink compound 14 increase the weight of the rotor 1, and the material cost. However, compared with commonly known technologies, the weight of the rotor in the embodiment FIG. 2 is not heavier. Besides, the heat sink compound 14 extends to the surface of the upper cover 13 and the bottom cover 11, so heat dissipation effect is much better than commonly known technologies. In addition, the heat holes 131 of the rotor is filled with the heat sink compound 14 which has a strength similar to that of resin, so the rotor has both good structural strength and heat dissipation effect.

Figure 3:
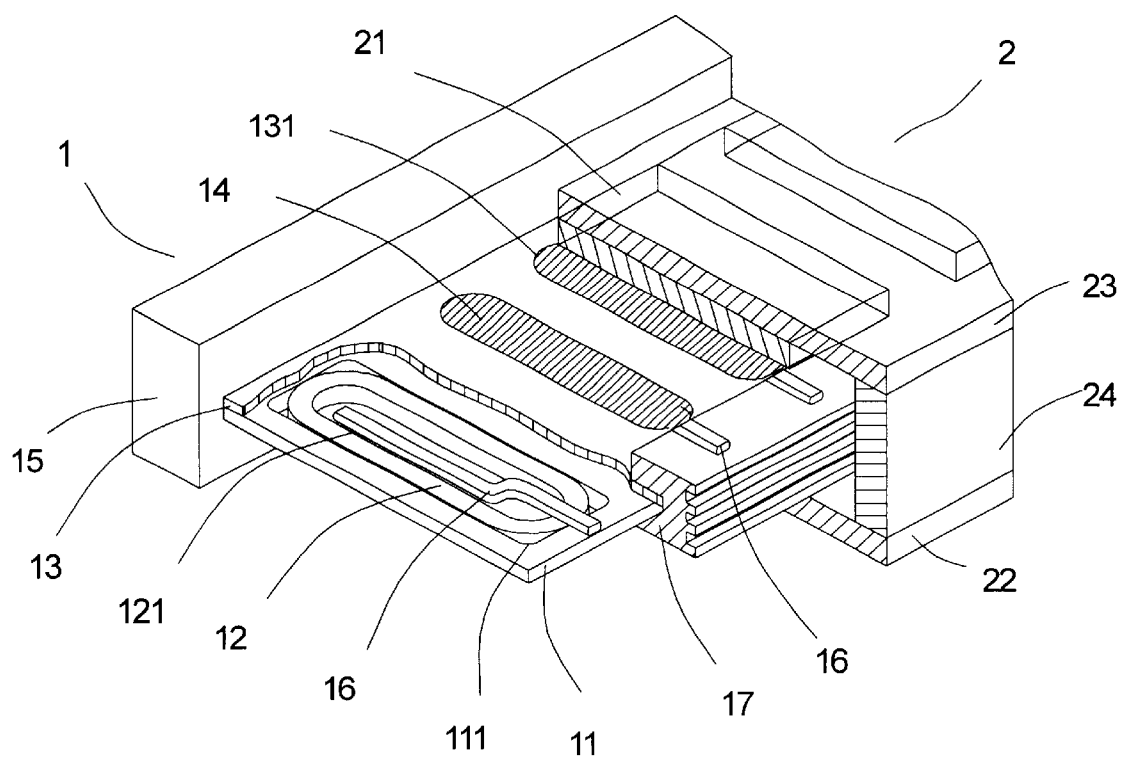
FIG. 3 is a perspective, partially view of an embodiment of the invention with an additional heat pipe.

FIG. 3 is a perspective, partially cutaway view of a preferred embodiment that includes additional heat pipes 16 set into the heat holes 131 of the rotor 1, and a heat sink 17 set into a distal end of the heat pipes 16. The heat pipes 16 serve as the media for conducting heat from the coils 12 to the heat sinks 17, and increase the strength of the rotor 1. The heat sink compound 14 is smeared between the coils 12 and the heat pipes 16 to increase the contact area and thermal conduction efficiency between the coils 12 and the heat pipes 16. In the embodiment of FIG. 3, because the heat pipes 16 are close to the heating coils 12, the heat pipes 16 provide a path for heat conduction to enable heat to pass through an insulating substance via the heat pipe 16 to cause heat to be conducted to the heat sink 17. The heat sink 17 increases the speed of heat dissipation to air to further increase the efficiency of heat dissipation. Because the heat pipes 16 are set in the heat holes 131, it is not like the commonly known technologies in which the thickness and the length of the rotor 1 is increased due to adding an enforced cooling mechanism, thereby increasing the weight.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A coreless type linear motor comprising a rotor and a stator, wherein said stator comprises a pair of parallel stator guide plates made of ferromagnetic material and a plurality of permanent magnets on each of said stator guide plates;

wherein said rotor comprises a bottom cover, an upper cover secured to the bottom cover, and a plurality of coils, said bottom cover, said upper cover and said coils extending between said pair of guide plates, and said permanent magnets on said guide plates facing said upper cover;

wherein a plurality coil troughs are set in said upper cover, said coils being buried in said coil troughs, said coils being made by winding conductive wires, and a plurality of heat holes being formed in said upper cover at locations adjacent respective centers of said coils, said heat holes communicating with an outside of said bottom cover to cause heat from said coils to be transmitted into air through said heat holes.

2. A coreless type linear motor as claimed in claim 1, further comprising a heat sink compound filled into said centers of said coils and said heat holes after said coils are buried into said coil troughs to cause heat from said coils to transit into air easily and to cause said upper cover to have good strength.

3. A coreless type linear motor as recited in claim 2, wherein a plurality of heat pipes are buried in said heat holes.

4. A coreless type linear motor as recited in claim 3, wherein said heat pipes are connected to a heat sink to help dissipate heat.

5. A coreless type linear motor as recited in claim 1, wherein a plurality of heat dissipation holes are set near each of said plurality of coils.

6. A coreless type linear motor as recited in claim 5, wherein a heat sink compound is filled into said plurality of heat dissipation holes to increase a strength of said upper cover and said upper cover.

* * * * *